Jan. 12, 1971  J. C. LITTMANN  3,554,045
MOMENTARY FLEXIBLE OVERLOAD RELEASE DEVICE
FOR A MOTOR DRIVE
Filed June 27, 1969  2 Sheets-Sheet 1

INVENTOR.
JOSEPH C. LITTMANN
BY
ATTORNEY

INVENTOR.
JOSEPH C. LITTMANN

United States Patent Office 3,554,045
Patented Jan. 12, 1971

3,554,045
MOMENTARY FLEXIBLE OVERLOAD RELEASE DEVICE FOR A MOTOR DRIVE
Joseph C. Littmann, Temperance, Mich., assignor to Dura Corporation, Toledo, Ohio, a corporation of New York
Filed June 27, 1969, Ser. No. 837,169
Int. Cl. E05f 15/16; F16d 3/14
U.S. Cl. 74—411       3 Claims

ABSTRACT OF THE DISCLOSURE

An overload release device for an electric motor drive which includes a driven gear enclosing a pinion-carrying actuator and between which are arranged flexible resilient rollers adapted to be compressed or deformed when subjected to an excessive torque, and upon release of such torque, the parts resume their normal driving relationship, spaced bearing means being provided between the actuator and the driven gear to militate against cantilevering of the bearing shaft.

SUMMARY OF THE INVENTION

Electric motor driven window regulators must be rendered inoperative when the window has reached its limit of movement in one direction or the other. For certain reasons it is regarded preferable to stall the electric drive motor at the limits of window travel. A clutch arrangement constituting an overload release device is provided which affords slippage between the electric drive motor and the driven mechanism. The clutch arrangement includes a gear and pinion between which a limited lost motion takes place in response to torque application. A feature of the invention involves the reduction in locking characteristics as well as a reduction in tooth deformation of the driven gear which normally takes place due to cantilevering of the bearing post on which the gear and pinion assembly are mounted.

DESCRIPTION OF THE PREFERRED EMBODIMENT

Figure 1:
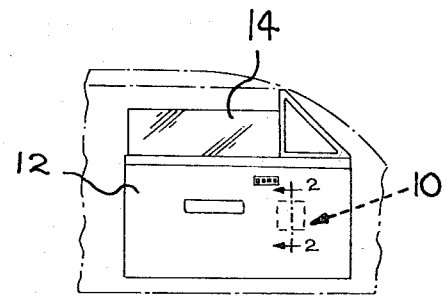
FIG. 1 is a side elevation of a vehicle door with the overload release device shown in its operative locale.
Figure 4:
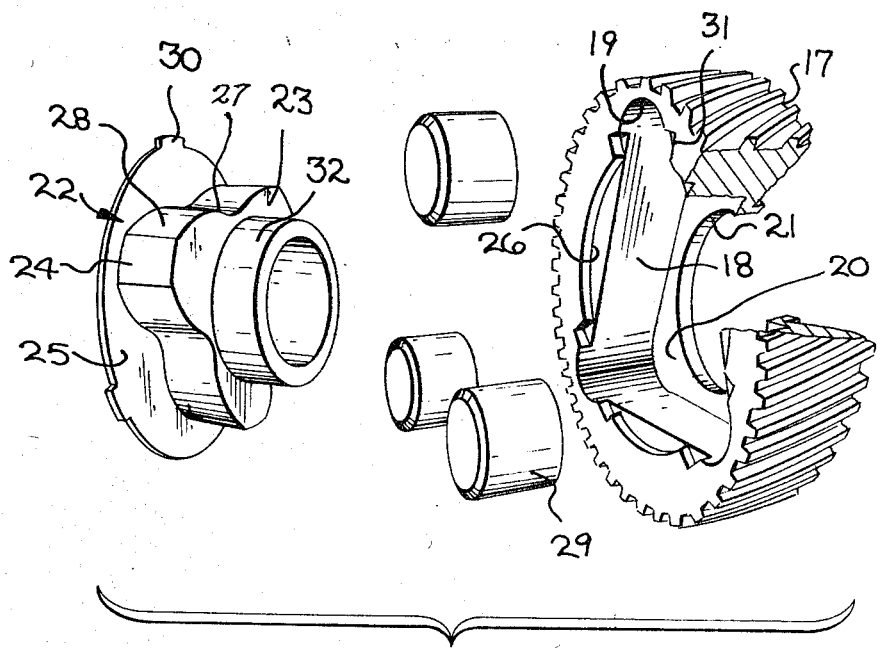
FIG. 4 is an exploded view of the parts of the overload release device.
Figure 2:
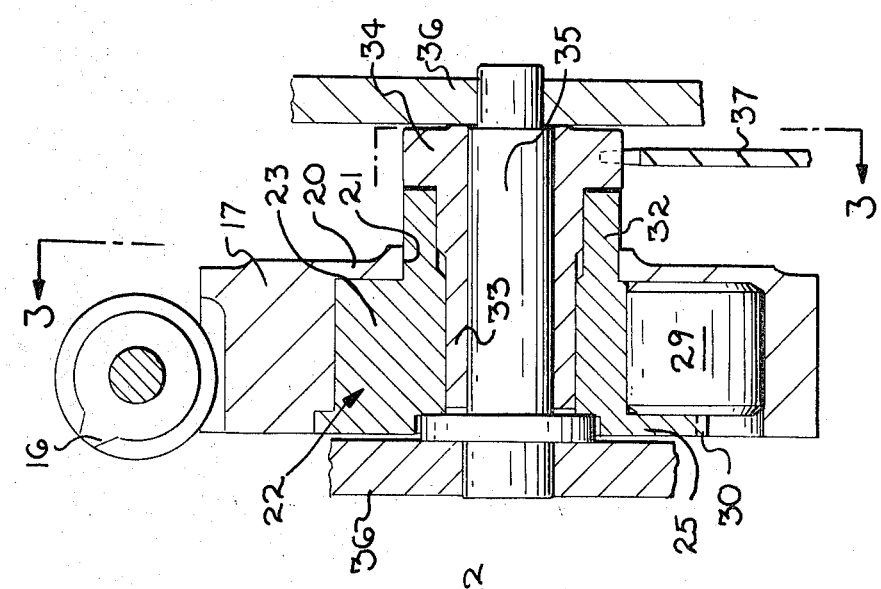
FIG. 2 is a sectional view on the line 2—2 of FIG. 1.
Figure 3:
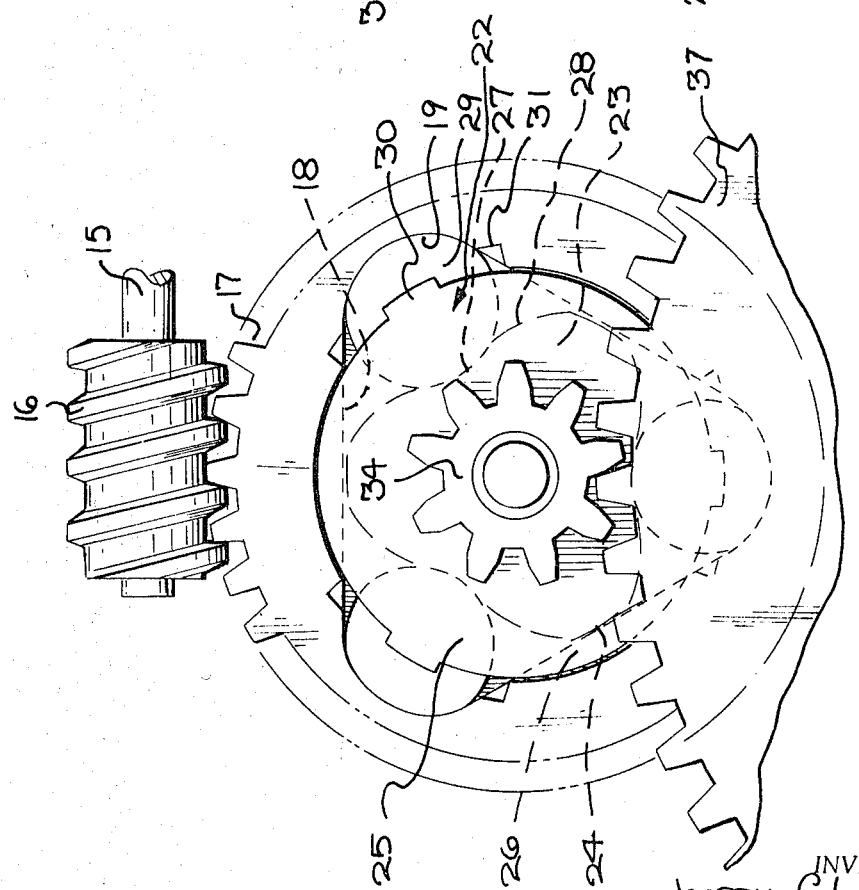
FIG. 3 is a sectional view on the line 3—3 of FIG. 2.

As shown in FIG. 1, there is a drive mechanism indicated at 10 which is mounted on the interior portion of a vehicle door 12 and is for the purpose of driving a window panel 14 upwardly or downwardly between predetermined points of travel.

An electric motor (not shown) has an output shaft 15 provided with a worm 16 which meshes with a gear 17 for rotationally driving same. The gear 17 is of any suitable wear resistant molded plastic which is hard and rigid, such as nylon. Interiorly the gear 17 is formed with a generally triangularly shaped cavity 18, the corner or apical portions 19 of which are rounded. One side of the cavity 18 is open and the other side has a wall 20 formed with an axial flanged opening 21.

Fitting within the gear 17 is a die cast metal driven actuator 22 formed with three equidistant radial lobes 23, the outer ends having flats 24, which are spaced inwardly from the walls of the cavity to enable relative rotational movement between the gear 17 and the actuator 22. At one side of the actuator 22 and integral with the lobes 23 is a circular disk 25, peripheral portions of which fit into and ride in arcuate flat bottom recesses 26, a recess being disposed between each pair of apical portions 19, thereby affording bearing surfaces for the rim of the disk 25.

Between each of the lobes 23 is a relatively shallow arcuate recess 27, opposite side walls of which merge into gently curved cam surfaces 28. Fitting respectively in the apical portions 19 of the gear 17 and recesses 27 of the actuator 22 are cylindrical rollers 29, which are of relatively flexible resilient plastic material, such as polyeurathane. Opposite ends of each roller are preferably chamfered as indicated. The structure is such that when an excessive torque is imparted to the gear 17 in either direction of turning movement, the rollers are yieldably pinched and thus afford limited relative movement between these parts. So soon as the excessive torque is relieved, the rollers resume their original shape and cause the parts to return to their normal position.

The relative turning movement between the gear 17 and the actuator 22 due to excessive applied torque is limited by tabs 30 which project outwardly from the periphery of the disk 25, there being three such tabs, one of which is disposed centrally of one end of each roller 29 in their normal position. On each side of each curved apical portion 19 is a notch 31 to receive a respective tab 30 to serve as an abutment for limiting the rocking movement of the actuator 22 in one direction or the other.

On the side opposite to the disk 25 the actuator 22 has a sleeve 32 on which the flanged opening 21 of the gear 17 bears. Fixed into the actuator, as by a spline fit, is a sleeve 33 which on its outer end has an integral pinion 34 which rotates on a bearing shaft 35 mounted at opposite ends in support members 36. The pinion 34 meshes with a drive gear 37 employed for raising and lowering the window panel 14. By rotationally controlling the motor which operates the output shaft 15, the window panel 14 can be appropriately actuated.

From the above, it will be apparent that there is provided an overload release device interposed between the motor driven worm 16 and the drive gear 37 for actuating the window panel 14 in an up or down direction. The release device is such that in the event of an excessive torque, the flexible resilient rollers 29 will be compressed or deformed to enable relative movements or slippage between the gear 17 and the actuator 22. Upon the release or diminution of such excessive torque the resiliency of the rollers 29 causes the clutch parts automatically to resume their normal positions. An important feature of the invention is reducing the gear tooth deformation by militating against canti-levering of the bearing shaft 35. Greater stability is afforded because of the bearing of the gear on the outer end of the shaft, and the bearing areas between the actuator disk 25 and the shallow bearing recesses 26. Limiting means to the up or down movement of the window panel is effected by the relative movement afforded between the driven gear 17 and the actuator 22 which would result in stalling the electric motor in the event the operator neglects to release the switch controlling the power to the electric motor.

What I claim is:
1. Overload release device for motor drive comprising a source of power, rotatable means driven by said source of power and having a gear provided a wall at one side and having an internal open faced cavity, curved recesses in said cavity, an actuator within said cavity having curved recesses adjacent the said gear recesses respectively, flexible resilient rollers having portions fitting adjacent recesses respectively so that upon deformation of said rollers due to excessive load lost motion takes place between said gear and actuator, a circular disk integral with one side of said actuator, arcuate recesses on one side portion of said gear in which rim portions of said disk have bearing, and an axial tubular extension on said actuator on the outside of which the said gear wall has bearing.

2. Overload release device for motor drive as claimed in claim 1, in which said arcuate recesses on said gear are equidistantly spaced, and a flange opening on the side wall of said gear rotatably engaging said axial tubular extension.

3. A drive mechanism for actuating a window regulator mechanism for shifting a window panel of an automobile between open and closed portions comprising a first gear which is adapted to be driven by an electric motor, a second gear meshing with said first gear, and a drive means adapted to be connected to a window regulator mechanism, said second gear having an internal cavity provided with a plurality of recesses equidistantly spaced from the gear axis, an actuator within said cavity and coaxial with said second gear and having recesses spaced from and corresponding respectively to said first recesses, flexible resilient deformable rollers occupying portions of adjacent recesses and being deformable due to excessive load to afford lost motion between said second gear and said actuator said second gear having arcuate recesses on one side adjacent the rim thereof, a disk on said actuator rotatively engaging said arcuate recesses, an axial tubular extension on said actuator, means providing a bearing between the other side of said second gear and said tubular extension, a pinion having a sleeve fixed axially in said actuator, said pinion engaging said drive means, and a shaft extending axially through said pinion and tubular extension and about which same is rotatable, and means supporting the end portions of said shaft.

References Cited

UNITED STATES PATENTS

| | | | |
|---|---|---|---|
| 2,764,003 | 9/1956 | Croset | 64—14 |
| 3,208,298 | 9/1965 | Pickles | 49—349X |
| 3,345,831 | 10/1967 | Boole | 64—27X |
| 3,406,583 | 10/1968 | Baier | 74—411 |
| 3,471,969 | 10/1969 | Littmann | 49—28 |

ALLAN D. HERRMANN, Primary Examiner

U.S. Cl. X.R.

49—28, 349; 64—27